UNITED STATES PATENT OFFICE.

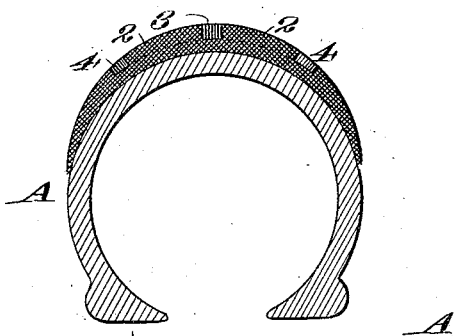
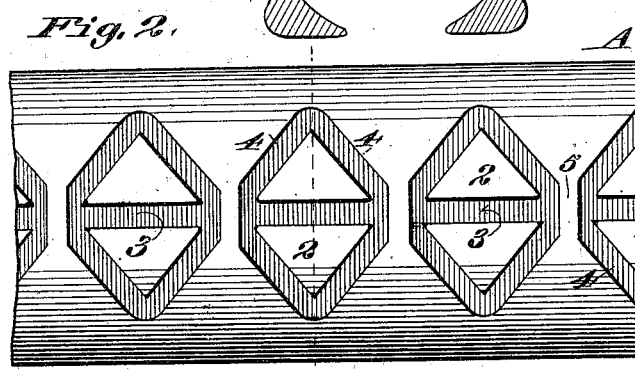
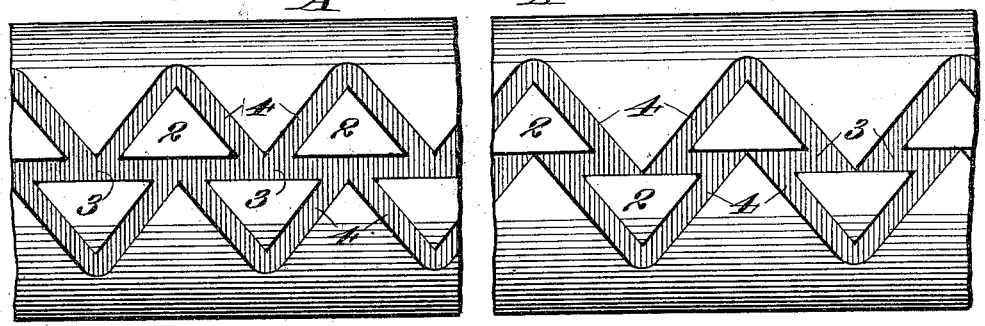
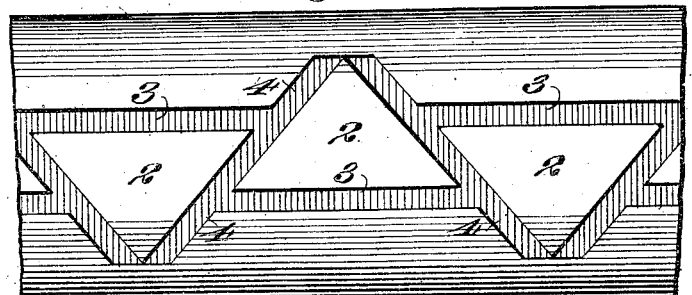

ROBERT HOMER KEATON, OF SAN FRANCISCO, CALIFORNIA.

NON-SKID TIRE.

979,961.  Specification of Letters Patent.  Patented Dec. 27, 1910.

Application filed January 24, 1910. Serial No. 539,655.

*To all whom it may concern:*

Be it known that I, ROBERT HOMER KEATON, citizen of the United States, residing in the city and county of San Francisco and State of California, have invented new and useful Improvements in Non-Skid Tires, of which the following is a specification.

My invention relates to tires, and pertains especially to rubber tires for automobiles and the like.

The especial object of the invention is to provide an anti-skidding tire simple in construction and durable and effective in service.

There are various anti-skidding tires and devices attached to tires, on the market, which are more or less objectionable. The principal objection is that they are expensive, and usually consist of small studs or projections on the tread of the tire, which projections not only tend to tear up the roadway, but they soon wear off and fail to do what is intended of them. Also, most of these projections being small, present only a small resistant or tractive face or area.

I have devised a tire, and on the tread portion of it have arranged a system of intersecting grooves which provide for a series of triangular skid-preventing members, which members are substantially flush with the periphery of the tire, so that a good bearing surface is afforded, and the walls of these members are so arranged as to overcome the tendency of the wheel to skid or to slip when acting as a tractor.

The invention consists of the parts and the construction and combination of parts as hereinafter more fully described and claimed, having reference to the accompanying drawings, in which—

Figure 1 is a cross-section of a tire embodying the invention. Figs. 2, 3, 4 and 5 are plan views of various forms of my improved tread.

A is a tire or the outside casing of an ordinary automobile wheel. The outer circumference in the line of the tread and for a distance of approximately an inch and a half more or less on each side of the center line of the tire, is checked off by a series of grooves or depressions to form a continuous series of triangular, or substantially triangular, projections 2; these projections usually being arranged in pairs, either opposed to each other, as shown in Fig. 1, or arranged in staggered relation, as shown in Figs. 2 and 3.

As shown in Fig. 1, there is a central circumferential groove 3, and each pair of triangular projections 2 is arranged with the bases of these triangles parallel and forming the walls of the groove 3, and the oppositely extending legs of the triangular projections are formed by other grooves 4 which intersect the central groove 3.

In the ordinary construction of treads having projecting anti-skid devices, the treads are made by putting the rubber in or on molds, and by means of pressure forcing the rubber to flow out into the depressions in the mold, thus getting the desired protuberances, which latter form the so-called antiskidding means.

By my method, and as I have practiced it, I make my tread without any molds, as I simply fashion strips or pieces of metal, fabric, or other suitable material into the desired shape corresponding to the grooves 3—4, and place them on the raw rubber tread after it is on the tire. Then when the tire is wrapped before vulcanizing, the said pieces or strips are pressed into the soft raw rubber and remain there until the same is vulcanized. On later being removed, the lines or figures due to the grooves 3—4 are formed in the tire, as desired.

The essential features of my invention are the triangular shape of the portions 2 and their arrangement in conjunction with the groove 3 which separates the bases of the triangles.

It is to be noted that the circumferential groove 3 is interrupted at intervals by the solid connecting portion 5 disposed between the triangular portions 2.

The triangular portions 2 preferably have their sides an inch or more in length, so that the three sides of every triangular piece will offer a substantial area either to resist side slip or to assist in forward traction. The side walls constituting the legs of these triangular pieces, which side walls are formed by the intersecting grooves 4, present an area to resist side slip substantially equal to the length of the base; and one wall of the grooves 3 forms the base of an opposed projection 2, and also assists in resisting side slip.

In going forward or backward each pair of projections 2 has two inclined faces to a ist in traction, and two walls of a pair of inclined grooves 4 coupled with the straight connecting piece 5 to assist toward the same end. These triangular projections 2 are flush with the periphery of the tire, and they are of such substantial area that experience shows that this tire of mine has a good solid tread, besides possessing the anti-skidding and tractive advantages mentioned.

Figs. 2, 3 and 4 simply show modifications of the same idea of using triangular anti-skid portions or projections flush with the tire and formed by depressions or grooves in the tire; the only difference being, in Figs. 2, 3 and 4, that the projections are arranged staggered, but with the bases of these projections extending substantially parallel with the circumferential line of the tire.

In all cases I produce my angular anti-skid members by means of one or more more-or-less-interrupted circumferential grooves 3 and laterally-extending intersecting grooves 4; the walls of these various grooves offering the necessary resistance to skidding or slipping, and the walls insuring good traction.

Thus by forming my angular projections 2 in the manner shown, and of considerable area and flush with the tire, experience shows that the wear on them is comparatively slight as to what it would be if these projections were formed above or outside the surface of the tire, so that the projections really extended outside of the tire.

Having thus described my invention, what I claim and desire to secure by Letters Patent is—

1. An improved tire having a tread portion with a central circumferential groove, said tire having triangular portions at each side of the groove with outer faces substantially flush with that of the tire, the bases of opposite triangles being parallel and spaced from each other and forming the walls of said groove, and the oppositely extending legs of the triangles separated from corresponding portions of the body of the tire to form other grooves which converge outwardly and connect at the outer angles of the triangles, while the inner ends of the last-named grooves intersect the said central groove, said grooves being molded into the tire and the walls of each of said grooves being square to prevent side slipping and to increase the tractive effect.

2. An improved tire having a tread portion with a central circumferential groove, said tire having triangular portions arranged in staggered relation at each side of the groove with outer faces substantially flush with that of the tire, the bases of the opposite triangles being parallel and spaced from each other and forming the walls of said groove, and the oppositely extending legs of the triangles being separated from corresponding portions of the body of the tire to form other grooves which converge outwardly and connect at the outer angles of the triangles, while the inner ends of the last-named grooves intersect the said central groove, said central and outwardly converging grooves being molded into the tire and the walls of each of said grooves being square to prevent side slipping and to increase the tractive effect.

In testimony whereof I have hereunto set my hand in the presence of two subscribing witnesses.

ROBERT HOMER KEATON.

Witnesses:
R. D. SWENEY,
W. O. VALLMER.